April 17, 1945. R. CLADE 2,373,742
LUBRICATED VALVE
Filed July 2, 1943
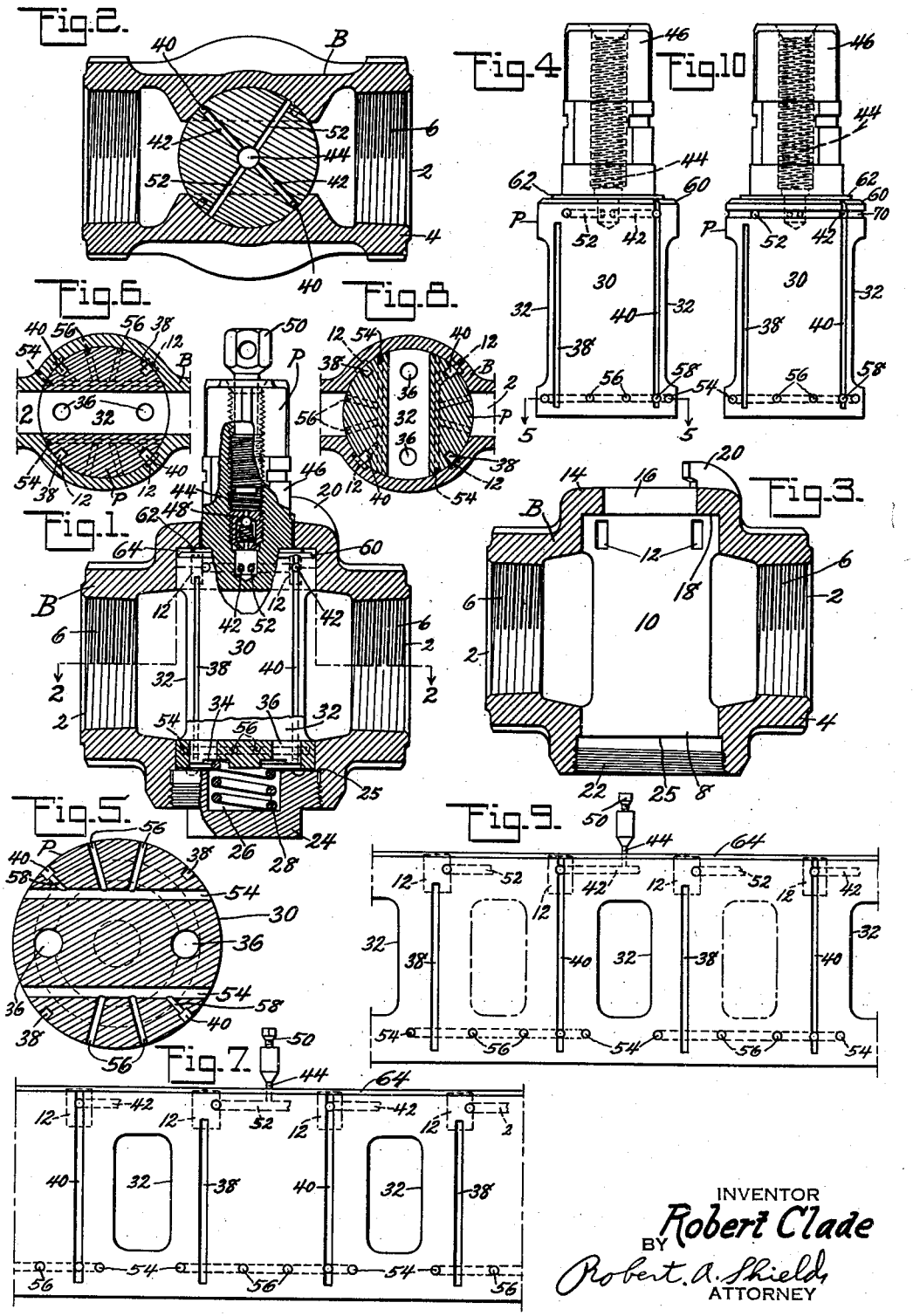
INVENTOR
Robert Clade
BY
Robert A. Shields
ATTORNEY Patented Apr. 17, 1945

2,373,742

UNITED STATES PATENT OFFICE 2,373,742

LUBRICATED VALVE

Robert Clade, Detroit, Mich., assignor to American Car and Foundry Company, New York, N. Y., a corporation of New Jersey Application July 2, 1943, Serial No. 493,219

6 Claims. (Cl. 251—93)

This invention relates to valves in general and in particular to cylindrical plug valves of the lubricated type. Lubricated valves as constructed in the past have allowed considerable washout of lubricant in the grooves exposed to the line fluid and in the grooves connected with this exposed groove. It is an object, therefore, of the present invention to fully lubricate a plug valve by an arrangement of passages whereby there is a minimum washout of lubricant by line fluid.

A further object of the invention is the provision of a fully lubricated plug valve in which the lubricant is effectively smeared over the seating surfaces of the plug and body.

A still further object of the invention is the provision of a fully lubricated plug valve in which the bulk of the lubricant supply passages are so arranged as to never be exposed to line fluid.

These and other objects of the invention will be apparent to persons skilled in the art from a study of the following description and accompanying drawing, in which Figure 1 is a partial sectional view of the improved valve;

Fig. 2 is a sectional view taken substantially on line 2—2 of Figure 1;

Fig. 3 is a sectional view of the valve body;

Fig. 4 is an elevational view of the improved plug;

Fig. 5 is a sectional view taken substantially on line 5—5 of Fig. 4;

Fig. 6 is a sectional view of a part of the body and plug and taken substantially on the center line of the valve and showing the plug in open position;

Fig. 7 is a development of the seating surfaces with the valve in open position as shown in Fig. 6;

Fig. 8 is a sectional view similar to Fig. 6 with the plug in closed position;

Fig. 9 is a development of the seating surfaces with the valve in closed position, and Fig. 10 is an elevational view of a slightly modified form of plug.

Referring now to the drawing in detail, it will be seen that the valve is made up of two main parts, namely, the body B and the plug P. The body, as clearly shown, is formed with a body passageway 2 extending through the attaching lips or flanges 4 which in the present case are equipped with threads 6 by means of which the valve body may be attached to adjacent piping or fixtures. Extending substantially at right angles to the axis of the body passageway is a cylindrical bore 8 which is adapted to receive the plug later to be described. This cylindrical bore is carefully machined or surfaced to provide a body seating surface 10 adapted to cooperate with the seating surface of the plug. In the present case four shallow depressions or dwarf grooves 12 are formed in the seating surface 10 of the cylindrical body bore for a purpose later to be described. These shallow depressions or dwarf grooves are located adjacent the head portion 14 of the body. This head portion is formed with a central opening 16 adapted to receive the stem of the plug and with an internally machined surface or head seating surface 18 which is, in the present case, disposed at right angles to the seating surface 10 of the cylindrical bore. In order that the plug, later to be described, may move through only ninety degrees a stop 20 is formed on the head portion with part overlapping slightly the opening 16 in the head. The base portion of the body is counter-bored and threaded as at 22 in order to receive a base cap or plug 24. This base cap or plug is adapted to be tightly screwed against the shoulder 25 of the counter-bored portion of the body and is formed with a depression 26 at its central portion and is adapted to receive a compression spring 28.

The plug P is formed with a cylindrical seating surface 30 interrupted by a plug passageway 32 extending diametrically through the plug and of a cross-section area substantially equal to the cross-section area of the body passageway. The base of the plug is recessed slightly to provide a projection 34 which serves as a centering lug for the spring 28 bearing against the base of the plug. Small openings 36 are provided extending through the base of the plug and into the passageway 32 in order that the pressure on the base of the plug and in the passageway may be equal and the entire plug urged upwardly toward the head of the body. The cylindrical seating surface 30 of the plug is interrupted by short longitudinally extending lubricant grooves 38 and by longer longitudinally extending lubricant grooves 40. These grooves are arranged in diametrically opposed pairs adjacent the sides of the plug passageway 32 as clearly shown in the figures and particularly in the development of the seating surfaces in Figs. 7 and 9. Lubricant is fed at all times to the relatively long grooves 40 by means of radial holes 42 extending from the groove 40 to the lower end of an axial hole 44 extending through the stem 46 of the plug. The axial hole is threaded to receive a check assembly 48 and a screw or ram 50 by means of which the lubricant inserted in the axial hole may be submitted to pressure forcing it into the groove stem of the plug. Additional radial holes 52 extend from the upper seating surface 30 of the plug into the lower end of axial hole 44 and these holes pierce the seating surface adjacent to but not in communication with the short longitudinal grooves 38. In order to smear lubricant over the lower surface of the plug chordal holes 54 are drilled or otherwise formed in the lower portion of the plug and located substantially parallel to the walls of the passageway 32 as clearly shown in Figs. 5, 6 and 8. These chordal holes are tapped by means of short radial holes 56 extending from the chordal hole to the seating surface 30 of the plug. In order that lubricant may at all times be fed to the chordal holes and to the short radial holes 56, a short radial hole 58 is provided extending from the lower end of the relatively long longitudinal groove 40 into the chordal hole 54. It will thus be seen that lubricant may be fed at all times to radial holes adjacent the upper and lower ends of the plug and to the relatively long longitudinal groove 40, which groove is never exposed to the line fluid. It will also be seen that the radial holes and chordal holes are above and below the passageway areas and likewise can never be exposed to the line fluid. It is obvious that the relatively short longitudinal grooves 38 are fully isolated from the lubricant supply insofar as the plug is concerned. However, in order that these grooves may be at times filled with lubricant their upper ends are adapted to register with the shallow cavities or dwarf grooves 12 in the seating surface of the body substantially at the same time that the outer end of radial hole 52 registers with the depression. In this way lubricant may be fed to the relatively short longitudinal grooves 38 only at such times as both grooves are in register with the dwarf grooves or cavities 12. Lubricant is supplied to seal the head seating surfaces of the plug and body by extending the comparatively long longitudinal groove 40 to the upper surface of the plug. An annular space to receive the lubricant is provided by beveling the upper corner of the plug as at 60 and by removing part of the metal on the upper end of the plug proper to provide a shoulder 62. The upper surface of this shoulder constitutes the head seating surface of the plug and is adapted to bear against and cooperate with the body head seating surface 18. By stepping back the head surface of the plug and forming the relatively narrow shoulder 62 the unit pressure between the head and plug is increased thereby more effectively sealing against leakage of lubricant and line pressure past the stem through opening 16. The lubricant space or annular groove provided by the beveling of the corner and the forming of the shoulder 62 is indicated in Figs. 1, 7 and 9 by numeral 64 and is normally of sufficient depth as to constantly supply lubricant to the cavities or dwarf grooves 12, but in case the depth is insufficient or the cavities misplaced, still lubricant will be supplied to the cavities by radial holes 52. As clearly shown, particularly in Figure 1, the plug is constantly pushed upwardly against the head by means of the compression spring 28 and the base of the plug is spaced slightly above the top of the body cap 24. Clearance is provided between the body cap 24 and the cylindrical plug permitting downward shifting of the cylindrical plug whenever the lubricant pressure in annular space 64 is sufficiently high. Downward shifting of the plug will, of course, separate the head seating surfaces of the plug and body allowing excess lubricant to escape around the stem thereby relieving pressure and preventing bursting of the body or plug. By careful determination of the relative areas of space 64 and shoulder 62 the point at which the valve plug will shift and relieve pressure may be determined.

In certain rare cases it may be necessary to supplement the smearing action of radial holes 52 with a complete ring of lubricant and this may be done by merely cutting a circumferential groove 70 in the upper seating surface of the plug as shown in Fig. 10. This circumferential groove is arranged in the plane of the radial holes 42 and 52 and will be constantly fed with lubricant. The provision of this circumferential groove as shown in Fig. 10 is the only change in the plug of Fig. 4 and accordingly like reference characters have been used in Fig. 10 as in Fig. 4 to designate the various parts.

As clearly shown in Figs. 7 and 9 wherein is illustrated the development of the seating surfaces of the plug and body, lubricant may be fed at all times from the source of pressure, that is, the axial hole 44, into radial holes 42 and 52 and also at all times into the relatively long longitudinal grooves 40 through the radial holes 42. Lubricant may feed both ways, through the longitudinal groove 40 into the head space 64 and into the chordal holes 54 through the short radial holes 58. Lubricant is directly supplied to the seating surfaces at the ends of the chordal holes and at the ends of short radial holes 56 tapping the chordal holes. The ends of these holes as they are moved across the seating surface of the body by rotation of the plug will smear lubricant over the seating surface of the body thereby forming a ring of smeared lubricant at the bottom of the plug. The same smearing action is accomplished by radial holes 52 at the top of the plug, while longitudinal grooves 40 smear the entire seating surface of the body from adjacent one body passageway to adjacent the other body passageway. The small area of seating surface not smeared by groove 40 is smeared by groove 38. In other words, the seating surface of the body immediately adjacent to the passageways is smeared by this groove 38. It is obvious that the groove 38 must move across the body passageway during rotation of the plug from open to closed position but it is likewise obvious that immediately upon starting rotation of the plug from either open or closed position toward the other position, the groove 38 moves out of register with the depressions or dwarf grooves 12 of the body and even if lubricant is washed out of groove 38 by the line fluid, it cannot be washed out of any of the radial holes or the longitudinal grooves 40 of the chordal holes 54. In other words, it cannot be washed out of the plug lubrication system. When, however, the plug is in its substantially full open or full closed position lubricant can be supplied through the body cavities or dwarf grooves 12 to the comparatively short longitudinal grooves 38. Since lubricant of itself is practically incompressible, it is understood, of course, that lubricant washed out of groove 38 can only be supplied by movement of ram 50. However, since the valve seating surfaces are quite effectively smeared by longitudinal grooves 40 and the radial and chordal holes, leakage is not likely to appear between periodic lubrication of the valve.

Although the valve has been described more or less in detail with reference to particular figures, it is obvious to persons skilled in the art that various modifications and rearrangements of parts other than those shown and described may be made and all such modifications and rearrangements of parts are contemplated as will fall within the scope of the appended claims defining my invention.

What is claimed is:

1. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, an annular groove located at the head end of the plug and reducing the area of the seating surfaces of said plug and plug head seating surfaces, a longitudinal groove interrupting said plug seating surface adjacent one side of the plug passageway at each end thereof and being connected to said annular groove, a source of lubricant pressure carried by the plug, a radial hole connecting each of said longitudinal grooves with the source of lubricant pressure, chordal holes extending through said plug adjacent the lower end thereof and each connected to a longitudinal groove, and a plurality of short radial holes interrupting said plug seating surface and extending inwardly for connection with said chordal holes, said grooves, chordal holes and short radial holes providing a smear of lubricant on the seating surfaces above, below and to the sides of said body passageway thereby sealing said valve against leakage.

2. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, an annular groove located at the head end of the plug and reducing the area of the seating surfaces of said plug and plug head seating surfaces, a plurality of cavities formed in the walls of said cylindrical bore and interrupting said body seating surface, said cavities overlapping said annular groove and open thereto at all times, a longitudinal groove interrupting said plug seating surface adjacent one side of the plug passageway at each end thereof and each being connected to said annular groove, a source of lubricant pressure connected to said annular and longitudinal grooves for supplying lubricant thereto, chordal holes extending through said plug adjacent the lower end thereof and each connected to a longitudinal groove, a plurality of short radial holes interrupting said plug seating surface and extending inwardly for connection with said chordal holes, and additional longitudinal grooves interrupting said plug seating surface adjacent the plug passageway and on the sides opposite from said first named longitudinal grooves, said additional longitudinal grooves being wholly free of connection with any plug groove or hole at all times except when brought into registry with said cavities by rotation of the plug.

3. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, an annular groove located at the head end of the plug and reducing the area of the seating surfaces of said plug and plug head seating surfaces, a longitudinal groove interrupting said plug seating surface adjacent one side of the plug passageway at each end thereof and being connected to said annular groove, a source of lubricant pressure carried by the plug, a radial hole connecting each of said longitudinal grooves with the source of lubricant pressure, and a plurality of spaced apart radial holes connected to said grooves and interrupting the plug seating surface substantially in a plane located between the lower end of said plug and plug passageway, said grooves and holes being at all times connected to said source of lubricant pressure and sealing the valve against leakage by the smearing of lubricant over the seating surfaces during rotation of the plug.

4. In a lubricated valve the combination of a valve body having a passageway therethrough for the flow of matter, a substantially cylindrical bore formed in the body and having its axis substantially normal to the axis of said passageway and its walls finished to provide a body seating surface, a body head portion at least partially closing one end of said bore and internally finished to provide a body head seating surface, a substantially cylindrical valve plug rotatably mounted in said bore and having the side and at least parts of one end finished to provide respectively plug and plug head seating surfaces, a passageway extending through the valve plug and adapted to register with said body passageway for flow of matter when said valve is in full open position, an annular groove located at the head end of the plug and reducing the area of the seating surfaces of said plug and plug head seating surfaces, a plurality of spaced apart cavities formed in the walls of said cylindrical bore and interrupting said body seating surface adjacent said body head seating surface, a longitudinal groove interrupting said plug seating surface adjacent one side of the plug passageway at each end thereof and being connected to said annular groove, a source of lubricant pressure carried by the plug, a radial hole connecting each of said longitudinal grooves with the source of lubricant pressure, additional radial holes connected to said source of pressure and interrupting said plug seating surface and adapted to supply lubricant directly to certain of said cavities when said plug is in either full open or closed position, additional longitudinal grooves interrupting said plug seating surface adjacent the plug passageway and on the sides thereof opposite from said first named longitudinal grooves, said additional grooves being wholly free of connection with said source of lubricant pressure except when brought into registry with said cavities by rotation of said plug, and a plurality of chordal and radial holes interrupting said plug seating surface beneath the bottom of the plug passageway and connected to said first named longitudinal grooves, all of said grooves, radial and chordal holes providing a smear of lubricant on the valve seating surfaces entirely surrounding the passageway to thereby seal said valve against leakage.

5. A lubricated valve as claimed in claim 1 in which said chordal holes extend through the plug beneath and in substantial parallelism with the side walls of the plug passageway.

6. A lubricated valve as claimed in claim 4 in which a circumferential groove interrupts the plug seating surface substantially in the plane of said first named radial holes and said additional radial holes, said circumferential groove overlapping and being in communication with said cavities at all times.

ROBERT CLADE.